US008981264B2

(12) United States Patent
Seger

(10) Patent No.: US 8,981,264 B2
(45) Date of Patent: Mar. 17, 2015

(54) SOLID STATE SWITCH

(75) Inventor: Ronald Neil Seger, Prior Lake, MN (US)

(73) Assignee: Phillips & Temro Industries Inc., Eden Prairie, MI (US)

(*) Notice: Subject to any disclaimer, the term of this patent is extended or adjusted under 35 U.S.C. 154(b) by 2681 days.

(21) Appl. No.: 11/486,884

(22) Filed: Jul. 14, 2006

(65) Prior Publication Data

US 2007/0194008 A1    Aug. 23, 2007

Related U.S. Application Data

(60) Provisional application No. 60/774,893, filed on Feb. 17, 2006.

(51) Int. Cl.
*F02G 5/00*    (2006.01)
*F02M 31/13*   (2006.01)

(52) U.S. Cl.
CPC .............. *F02M 31/13* (2013.01); *Y02T 10/126* (2013.01)
USPC .......................................... 219/502; 123/549

(58) Field of Classification Search
USPC ............. 219/462.1, 486, 490, 502, 600, 635, 219/661, 663; 123/434, 549, 556
See application file for complete search history.

(56) References Cited

U.S. PATENT DOCUMENTS

| | | | |
|---|---|---|---|
| 3,851,278 A | 11/1974 | Isono | |
| 3,934,567 A | 1/1976 | Fujieda et al. | |
| 4,034,204 A | 7/1977 | Windsor et al. | |
| 4,944,260 A | 7/1990 | Shea et al. | |
| 5,094,198 A | 3/1992 | Trotta et al. | |
| 5,347,966 A | 9/1994 | Mahon et al. | |
| 5,922,232 A | 7/1999 | Merz | |
| 5,990,459 A | 11/1999 | Feustel et al. | |
| 6,118,239 A * | 9/2000 | Kadah | 318/268 |
| 6,392,207 B2 | 5/2002 | Beetz et al. | |
| 6,635,851 B2 | 10/2003 | Uhl | |
| 6,700,105 B2 | 3/2004 | Morrison | |
| 6,712,032 B2 | 3/2004 | Uhl et al. | |
| 6,715,472 B2 | 4/2004 | Stephan et al. | |
| 6,736,098 B2 | 5/2004 | Toedter et al. | |
| 6,807,041 B2 | 10/2004 | Geiger et al. | |
| 6,810,203 B2 | 10/2004 | Alban et al. | |
| 6,872,922 B2 | 3/2005 | Uhl | |
| 6,906,288 B2 | 6/2005 | Toedter et al. | |
| 6,911,630 B2 | 6/2005 | Neckel | |

(Continued)

FOREIGN PATENT DOCUMENTS

WO    WO2005/012807    2/2005

OTHER PUBLICATIONS

WO 2005/012807 Prust et al Feb. 2005.*

(Continued)

*Primary Examiner* — Brian Jennison
(74) *Attorney, Agent, or Firm* — Harness, Dickey & Pierce, P.L.C.

(57) ABSTRACT

An intake air heating system for an internal combustion engine is disclosed and includes an electric heater that heats the intake air and a control module that switches a voltage to the electric heater based on a control signal. The control module includes a gate drive module that includes a bootstrap charge pump module and generates a gate drive signal based on the control signal and that is referenced to the voltage. The control module also includes a power module that switches the power to the electric heater based on the gate drive signal.

20 Claims, 6 Drawing Sheets

(56) References Cited

U.S. PATENT DOCUMENTS

| | | |
|---|---|---|
| 6,964,269 B2 | 11/2005 | Gschwind et al. |
| 7,002,106 B2 | 2/2006 | Toedter et al. |
| 7,044,115 B2 | 5/2006 | Gschwind et al. |
| 2002/0000221 A1 | 1/2002 | Kilb et al. |
| 2002/0092508 A1 | 7/2002 | Kanekawa et al. |
| 2004/0003800 A1 | 1/2004 | Gschwind et al. |
| 2004/0025852 A1 | 2/2004 | Kanekawa et al. |
| 2004/0126286 A1 | 7/2004 | deRuyter |
| 2005/0034449 A1 | 2/2005 | Frieden et al. |
| 2005/0092727 A1 | 5/2005 | Fraley et al. |
| 2005/0120789 A1 | 6/2005 | Matsumoto et al. |
| 2005/0235970 A1 | 10/2005 | Carretero |
| 2005/0257781 A1 | 11/2005 | Linkenhoger |
| 2006/0150959 A1* | 7/2006 | Prust et al. ............ 123/549 |
| 2007/0039596 A1 | 2/2007 | Carretero |
| 2007/0062497 A1 | 3/2007 | Joppig et al. |

OTHER PUBLICATIONS

"Thermal Substrates: T-Clad", The Bergquist Company, http://www.bergquistcompany.com/ts_thermal_clad.cfm, Copyright 2006.

"Second Generation ISS Diesel Cold Start Technology with Preheated Intake Air", Martin Blanc, Steffen Geiger, Hans Houben, Thomas Hovestadt and Olaf Toedter, MTZ, May 2006, vol. 67, pp. 10-13.

"3946 Half-Bridge Power MOSFET Controller", Allegro MicroSystems, Inc., Data Sheet, Copyright 2003, 2004.

"IR2117(S)/IR2118(S)&(PbF) Single Channel Driver", International Rectifier, Data Sheet No. PD60146 Rev N, Apr. 2, 2004.

* cited by examiner

SOLID STATE SWITCH

CROSS-REFERENCE TO RELATED APPLICATIONS

This application claims the benefit of U.S. Provisional Application No. 60/774,893, filed on Feb. 17, 2006. The disclosure of the above application is incorporated herein by reference in its entirety.

FIELD OF THE INVENTION

The present invention generally relates to an electrical circuit for switching current through resistive loads such as intake air heaters for internal combustion engines.

BACKGROUND

The Background description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

An electrically-powered intake air heater is useful for heating air as it enters the intake of an associated internal combustion engine. Depending on the thermal conditions of the engine and the ambient air, it may be desirable to heat the intake air prior to attempting to start the engine. In some applications the intake air is heated for a predetermined time that is based on the ambient air temperature.

The intake air heater can be turned on and off by a relay or transistor switch that is included in, or controlled by, a heater control module. State of the art heater control module circuits are undesirably limited in their ability to reliably control power to high-power, e.g. greater than 1.5 KW, air heaters.

SUMMARY OF THE INVENTION

An intake air heating system for an internal combustion engine is disclosed and includes an electric heater that heats the intake air and a control module that switches a voltage to the electric heater based on a control signal. The control module includes a gate drive module that includes a bootstrap charge pump module and generates a gate drive signal based on the control signal and that is referenced to the voltage. The control module also includes a power module that switches the power to the electric heater based on the gate drive signal.

A method is disclosed for heating the intake air of an internal combustion engine. The method includes generating a control signal that toggles between first and second voltages and indicates a desired degree of heating, converting the control signal to a gate signal that toggles between third and fourth voltages, generating a switched power signal based on the gate signal and, converting the switch power signal to heat that heats the intake air.

An intake air heating system for an internal combustion engine is disclosed and includes an electric heater for heating the intake air and a control module that receives a control signal and switches power to the electric heater based on the control signal. The control module includes a gate drive module that generates a gate drive signal based on the control signal, a first terminal that receives current passing through the electric heater, a second terminal that outputs current passing through the electric heater, and a plurality of field effect transistors that are controlled by the gate drive signal and switch an equal portion of the current on and off between the first and second terminals.

A circuit for switching power to a resistive load is disclosed and includes an input that receives a control signal, a gate drive module, and a power module. The gate drive module includes a first charge pump module that generates a first voltage and a bootstrap charge pump module that generates a second voltage. The gate drive module generates a gate drive signal that is based on the control signal and that has an amplitude based on the second voltage and a voltage of the power switched to the resistive load. The power module switches the power to the resistive load based on the gate drive signal. The control signal represents an amount of power that is desired to be dissipated by the resistive load.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
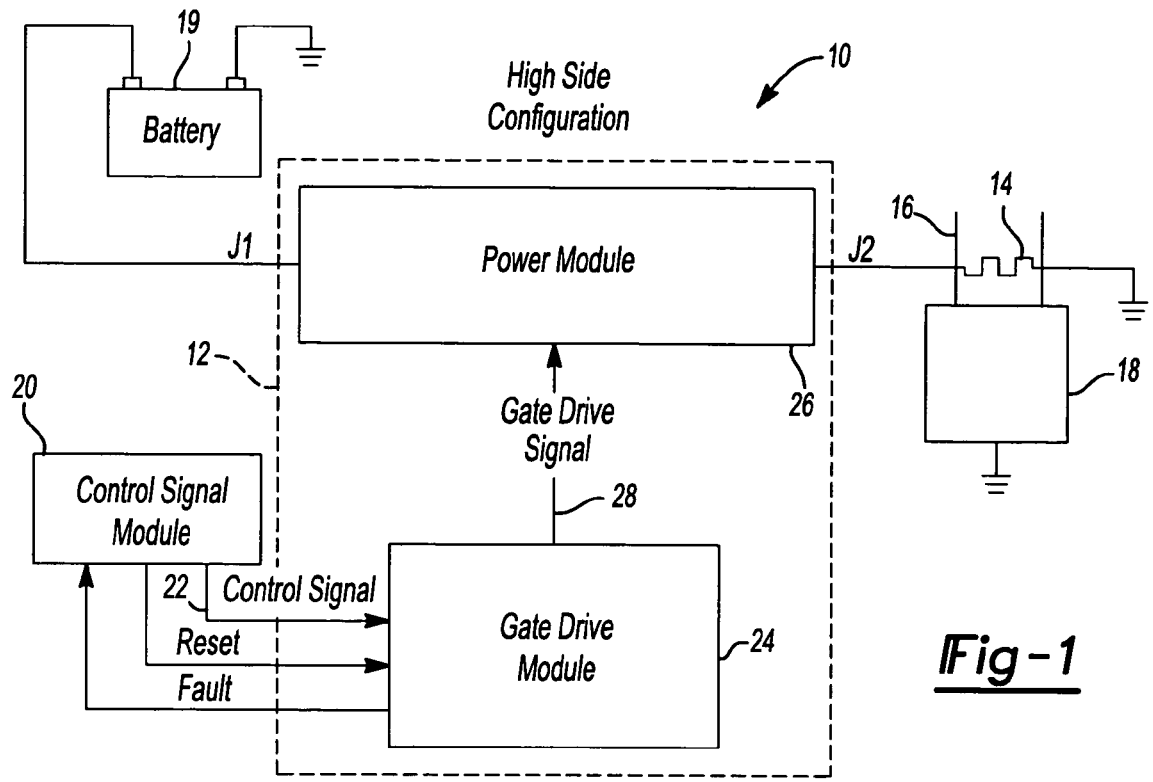
FIG. 1 is a functional block diagram of an intake-air heater system.

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Referring now to FIG. 1, an intake air heater system 10 is shown. Heater system 10 includes a heater control module 12 that modulates power to a resistive air heater 14. The modulation can be a pulse width modulation. Air heater 14 can be positioned in an air stream of an inlet tube 16 for an internal combustion engine 18. In some embodiments internal combustion engine 18 can be a diesel engine. Power for air heater 14 can be provided by a battery 19. A control signal module 20 generates a control signal 22 that is communicated to heater control module 12. Heater control module 12 modulates or switches power to air heater 14 based on control signal 22. In some embodiments control signal module 20 can be an engine control module that provides other control signals, e.g. fuel injection signals, to internal combustion engine 18. In some embodiments heater control module 12 can be incorporated with control signal module 20.

Heater control module 12 includes a gate driver module 24 and a power module 26. Gate driver module 24 converts control signal 22 into a gate drive signal 28. Power module 26 modulates or switches current though air heater 14 based on gate drive signal 28.

Figure 2:
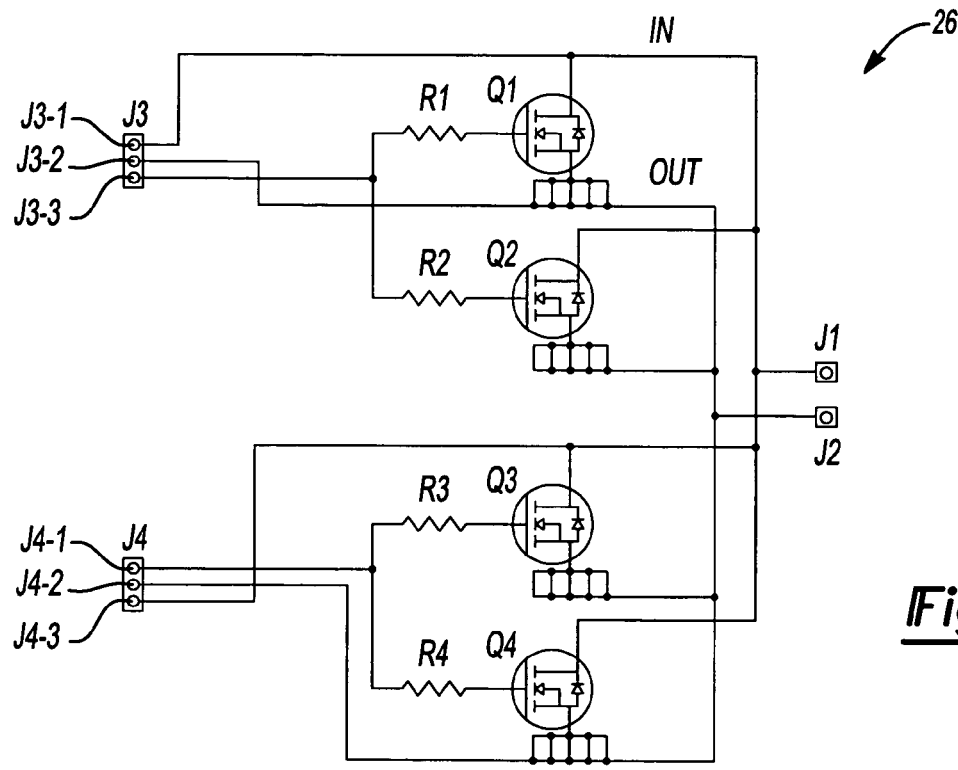
FIG. 2 is a schematic drawing of a power module of the circuit of FIG. 1.

Referring now to FIG. 2, one of several embodiments is shown of power module 26. Power module 26 includes a plurality of transistors Q1-Q4 that switch current flowing through a terminal J1 and a terminal J2. Transistors Q1-Q4 can be field effect transistors (FETs) or insulated gate bipolar transistors (IGBTs). Transistors Q1-Q4 are simultaneously turned on and off by gate drive signal 28. While power module 26 is shown as having four transistors, it should be appreciated by those skilled in the art that power module 26 can include more or fewer transistors. Terminal J1 receives power from battery 19. Terminal J2 provides modulated power to air heater 14. Transistors Q1-Q4 are connected in the circuit such that each transistor conducts an equal amount of the current flowing through terminals J1 and J2.

Power module 26 includes a connector J3 and a connector J4 that can mate with corresponding connectors on gate driver module 24. Connectors J3 and J4 facilitate spacing power module 26 away from gate drive module 24. The spacing provides a thermal barrier between transistors Q1-Q4, which can generate a considerable amount of heat, and gate drive module 24. Connector J3 includes three terminals J3-1, J3-2, and J3-3. Terminal J3-1 communicates with terminal J1 and drains of transistors Q1-Q4. Terminal J3-2 communicates with terminal J2 and sources of transistors Q1-Q4. Terminal J3-3 communicates gate drive signal 28 to transistors Q1-Q2 through respective resistors R1 and R2. Connector J4 includes three terminals J4-1, J4-2, and J4-3. Terminal J4-1 communicates gate drive signal 28 to transistors Q3-Q4 through respective resistors R3 and R4. Terminals J4-2 and J4-3 communicate with terminals J3-2 and J3-1, respectively. Resistors R1-R4 manipulate gate drive signal 28 to control turn-on and/or turn-off times of transistors Q1-Q4.

Figure 3:
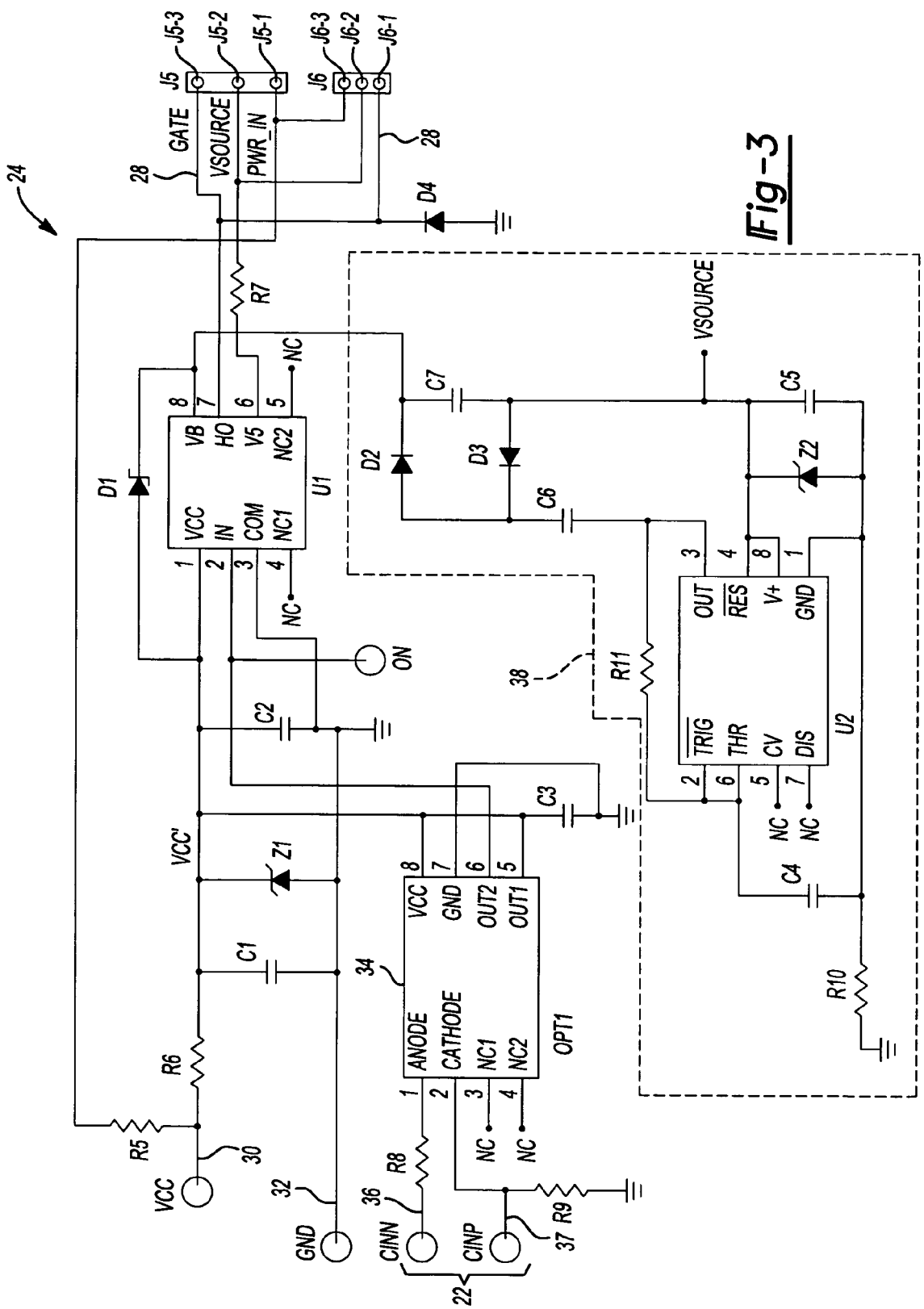
FIG. 3 is a schematic of a first embodiment of a gate driver module of the system of FIG. 1.

Referring now to FIG. 3 a first of several embodiments is shown of gate driver module 24. The first embodiment of gate driver module 24 can generate gate drive signal 28 in one of two modes. A first mode of gate driver module 24 is used when heater control module 12 operates as a solid-state relay and switches power on and off (e.g. 0% or 100% power) to air heater 14. Gate drive module 24 is configured to operate in the first mode by connecting a switch or relay contacts (not shown) across a VCC input terminal 30 and the CINN terminal of gate drive module 24. When the switch is closed heater control module 12 applies 100% power to air heater 14 and when the switch is open heater control module 12 turns off power to air heater 14.

A second mode of gate driver module 24 is assumed for the remainder of this description and is used when heater control module 12 modulates power (e.g. 0-100% power) to air heater 14. Gate drive module 24 is configured to operate in the second mode by leaving-VCC input terminal 30 open and applying control signal 22 to a CINN input terminal 36 and a CINP input terminal 37.

Gate driver module 24 includes connectors J5 and J6 that mate with corresponding connectors J3 and J4. Gate driver module 24 receives power from battery 19 via terminals J5-1 and J6-3.

Input terminal 30 communicates with one end of a resistor R5 and one end of a resistor R6. The other end of resistor R5 communicates with a terminal J5-1 and a terminal J6-3. The other end of resistor R6 communicates with one end of a capacitor C1, a cathode of a zener diode Z1, one end of a capacitor C2 and pin 1 of an integrated circuit U1. The cathode of zener diode Z1 clamps a voltage VCC' to input voltage limit of integrated circuit U1. Ground 32 communicates with the other end of capacitor C1, an anode of zener diode Z1, the other end of capacitor C2 and pin 3 of integrated circuit U1. A zener diode D1 connects across pins 1 and 8 of integrated circuit U1 and allows initial boot charge current. Zener diode Z1 also prevents a charge pump of integrated circuit U1 from exceeding a predetermined voltage that is greater than the voltage of battery 19.

Integrated circuit U1 generates gate drive signal 28 at a voltage higher than the voltage of battery 19 and also isolates the signal that is generated at pin 6 of an optoisolator 34 from power module 26. In some embodiments integrated circuit U1 can be part number IR2117 from International Rectifier, or its equivalent.

Optoisolator 34 electrically isolates control signal 22 from the signal input at pin 2 of integrated circuit U1. Control signal 22 is applied to terminals 36 and 37. Terminal 36 communicates with an anode of optoisolator 34 through a resistor R8. A reference terminal of control signal 22 is applied to a terminal 37. Terminal 37 communicates with a cathode of optoisolator 34. The cathode of optoisolator 34 also communicates with ground 32 through a resistor R9. A power input of optoisolator 34 communicates with a power supply at the cathode of zener diode Z1. A ground terminal of optoisolator 34 communicates with ground 32. A first output (pin 5) and a power supply input (pin 8) of optoisolator 34 communicate with VCC. A capacitor C3 connects across the power supply input of optoisolator 34 and ground 32. A second output at pin 6 of optoisolator 34 communicates with the input terminal of integrated circuit U1. A ground terminal of optoisolator 34 communicates with ground 32. Optoisolator 43 opens and closes a connection between the first output (pin 5) and the second output (pin 6) based on control signal 22.

In some embodiments optoisolator 34 can be eliminated and control signal 22 can be referenced to ground and applied to an ON terminal that communicates with the input at pin 2 of integrated circuit U1.

A charge pump module 38 generates a voltage that is greater than the voltage of battery 19 and supplements the charge pump that is included in integrated circuit U1. The voltage from charge pump module 38 is applied to integrated circuit U1 to assure that integrated circuit U1 can provide current required for 100% duty cycle of gate drive signal 28. Charge pump module 38 includes an integrated circuit U2. In some embodiments integrated circuit U2 can be a 555 timer. Charge pump module 38 includes a resistor R10 with one end connected to ground 32. The other end of resistor R10 connects to ground of integrated circuit U2 and one end of a capacitor C4. The other end of capacitor C4 communicates with threshold and trigger pins of integrated circuit U2 and one end of a resistor R11. The other end of resistor R11 communicates with one end of a capacitor C6 and an output pin of integrated circuit U2. The other end of capacitor C6 communicates with an anode of a diode D2 and a cathode of a diode D3. A capacitor C7 includes a first end that communicates with a cathode of diode D2 and a second end that communicates with an anode of diode D3. An anode of diode D3 communicates with a reset input of integrated circuit U2, a power supply input of integrated circuit U2, a cathode of a zener diode Z2 and terminals J5-2 and J6-2. An anode of zener diode Z2 communicates with ground of integrated circuit U2. A capacitor C5 connects across the power supply input and ground of integrated circuit U2. The output voltage of charge pump module 38 can be taken at the junction of capacitor C7 and the cathode of diode D2.

Gate drive signal 28 can be taken at an output pin 7 of integrated circuit U1. Output pin 7 communicates with terminals J5-3 and J6-1. Integrated circuit U1 receives power from battery 19 via a resistor R7 and terminals J5-2 and J6-2. A cathode of a diode D4 communicates with gate signal 28. An anode of diode D4 communicates with ground. Diode D4 prevents a negative voltage from appearing across gate/source junctions of transistors Q1-Q4.

Figure 4:
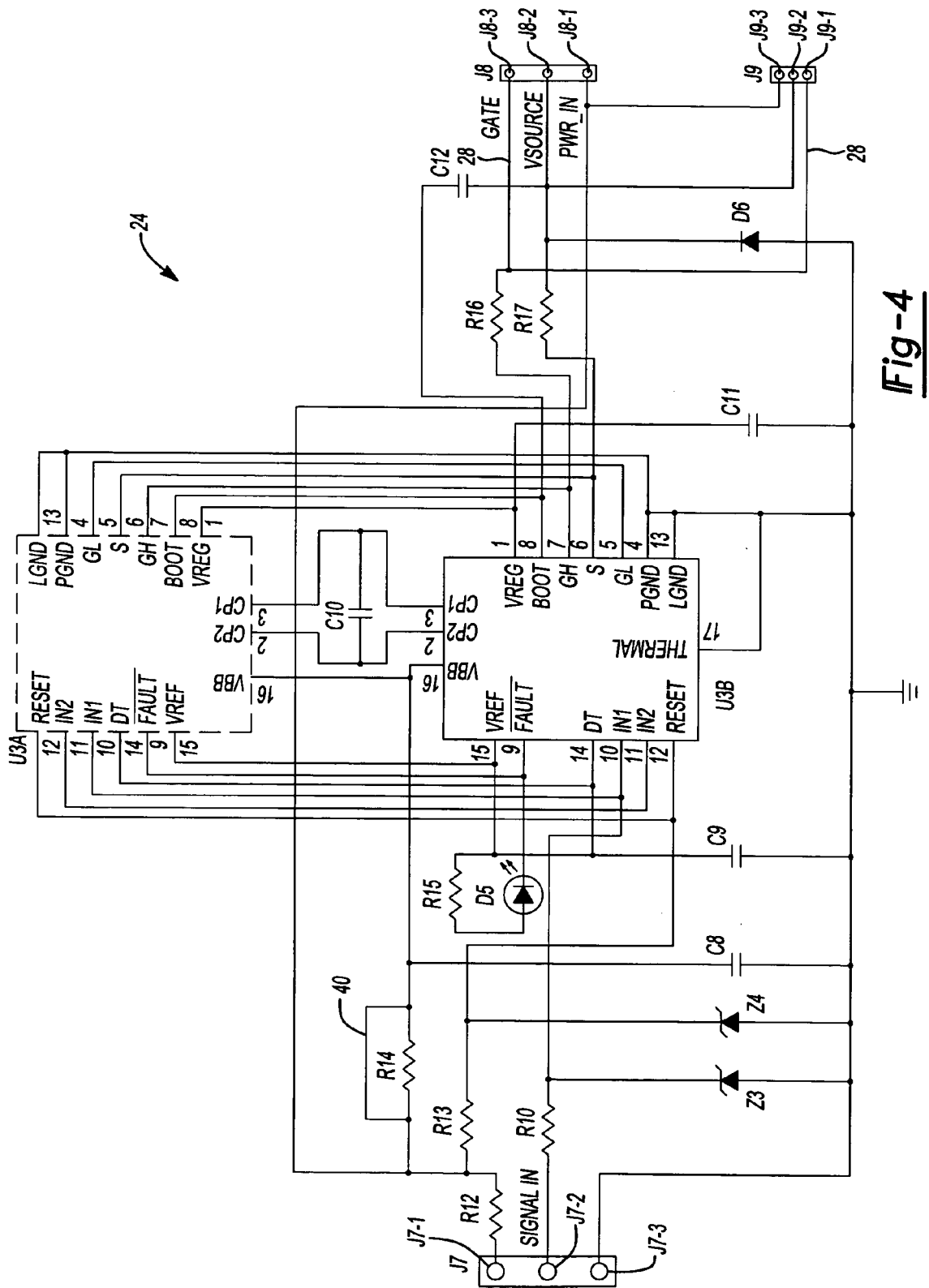
FIG. 4 is a schematic of a second embodiment of a gate driver module of the system of FIG. 1.

Referring now to FIG. 4 a second of several embodiments is shown of gate driver module 24. The second embodiment of gate driver module 24 includes provisions for integrated circuits U3A and U3B. The provisions, such as circuit board pad layouts, for integrated circuits U3A and U3B are electrically equivalent but accommodate different integrated circuit packages. For example, the provisions for integrated circuit U3A can accommodate a small outline integrated circuit package (SOIC) and the provisions for integrated circuit U3B can accommodate a thin shrink small outline package (TSSOP) package. In practice only one of integrated circuits U3A and U3B is used. The provisions for two types of integrated circuit packages allow a manufacturer of the second embodiment of gate driver module 24 to choose the integrated circuit package based on factors such as market price and/or availability. The description below assumes that integrated circuit U3B is populated in the circuit, however it should be appreciated the description also applies to integrated circuit U3A.

A connector J7 includes a terminal J7-2 that receives control signal 22. Terminal J7-1 communicates with one end of a resistor R10. The other end of resistor R10 communicates with a cathode of a zener diode Z3 and an input of an integrated circuit U3. In some embodiments integrated circuit U3B can be part number 3946 from Allegro Microsystems, Inc., or its equivalent. An anode of zener diode Z3 communicates with ground 32.

A terminal J7-3 communicates with ground 32. A terminal J7-1 communicates with one end of a resistor R12. The other end of resistor R12 receives battery power via a terminal J8-1 and/or a terminal J9-3. A connector J8 and a connector J9 mate with connectors J3 and J4, respectively, of power module 26 (FIG. 2). The other end of resistor R12 communicates with one end of a resistor R13 and one end of a resistor R14. In some embodiments resistor R14 can be bypassed with a jumper 40. The second end of resistor R13 communicates with a cathode of a zener diode Z4 and a reset terminal of integrated circuit U3B. A second end of resistor R14 communicates with one end of a capacitor C8 and a supply voltage input (VBB) of integrated circuit U3B. The other end of capacitor C8 and an anode of zener diode Z4 communicate with ground 32.

Integrated circuit U3B accommodates a wide voltage range of battery 19 to assure that transistors Q1-Q4 can be fully turned on even when the voltage of battery 19 is less than nominal. For example, the voltage of battery 19 can dips significantly while air heater 14 is turned on and integrated circuit U3B assures that transistors Q1-Q4 do not operate in the linear mode except during brief moments during turn-on and turn-off.

Integrated circuit U3B includes a charge pump module that accommodates a range of battery voltages. When a VBB pin of integrated circuit U3B is <8 V, the charge pump module operates as a voltage doubler. When VBB is between 8V and 15V the charge pump module operates as a voltage doubler/PWM, current-controlled, voltage regulator. When VBB is greater than 15 V the charge pump module operates as a PWM, current-controlled, voltage regulator. The charge pump module communicates with a charge pump capacitor C10. This charge pump module communicates with a capacitor C11 and a voltage regulator module internal to integrated circuit U3B. The charge pump module and voltage regulator module cooperate to maintain VREG pin of integrated circuit U3B at a nominal voltage, such as 13 volts.

A bootstrap charge pump module charges a capacitor C12. Capacitor C12 connects to a bootstrap input at pin 8 of integrated circuit U3B and terminals J8-2 and J9-2. The bootstrap charge pump module and the charge stored in capacitor C12 can supplement the first charge pump module of integrated circuit U3B to assure that integrated circuit U3B can fully turn on transistors Q1-Q4 at 100% duty cycle. An output voltage of the bootstrap charge pump module is based on a load voltage sensed at input pin S of integrated circuit U3B. The output voltage is referenced or bootstrapped to the voltage of battery 19 and allows U3B to generate a gating voltage for transistors Q1-Q4 that is approximately 10 volts higher than the voltage of battery 19.

Pin S communicates with one end of a resistor R17. The other end of resistor R17 communicates with terminals J8-2 and J9-2. A cathode of a diode D6 communicates with the terminals J8-2 and J9-3. An anode of diode D6 communicates with ground 32. Diode D6 prevents the voltage of sources of transistors Q1-Q4 from going less than a diode drop below ground 32.

Integrated circuit U3B can detect internal fault conditions and indicate the fault conditions through a fault output at pin 9. Examples of faults include under-voltage of the bootstrap charge pump (e.g. if capacitor C12 discharges enough to prevent fully turning on transistors Q1-Q4) and/or a temperature of integrated circuit U3B exceeding a predetermined temperature. In some embodiments an LED D5 can communicate with integrated circuit U3B. LED D5 illuminates and/or flashes to indicate a fault condition of integrated circuit U3B to a user. A current-limiting resistor R15 can be connected in series with LED D5. In some embodiments the fault output can communicate with control signal module 20 (shown in FIG. 1). In such an embodiment control signal module 20 can take action, such as turning off air heater 14 and/or altering a control strategy for internal combustion engine 18. In some embodiments the fault signal can be communicated to control signal module 20 via a communication network such as CAN and SAE J1850.

An output signal of integrated circuit U3 appears at a high-side output pin 7 and is applied to one end of a resistor R16. The other end of resistor R16 provides the gate signal to terminals J8-3 and J9-1. Integrated circuit U3B can include a thermal slug that conducts heat from an interior of integrated circuit of U3B. The thermal slug, which is identified as pin 17, can be connected to ground 32 to reduce noise in integrated circuit U3B that is generated by electromagnetic fields.

Figure 5:
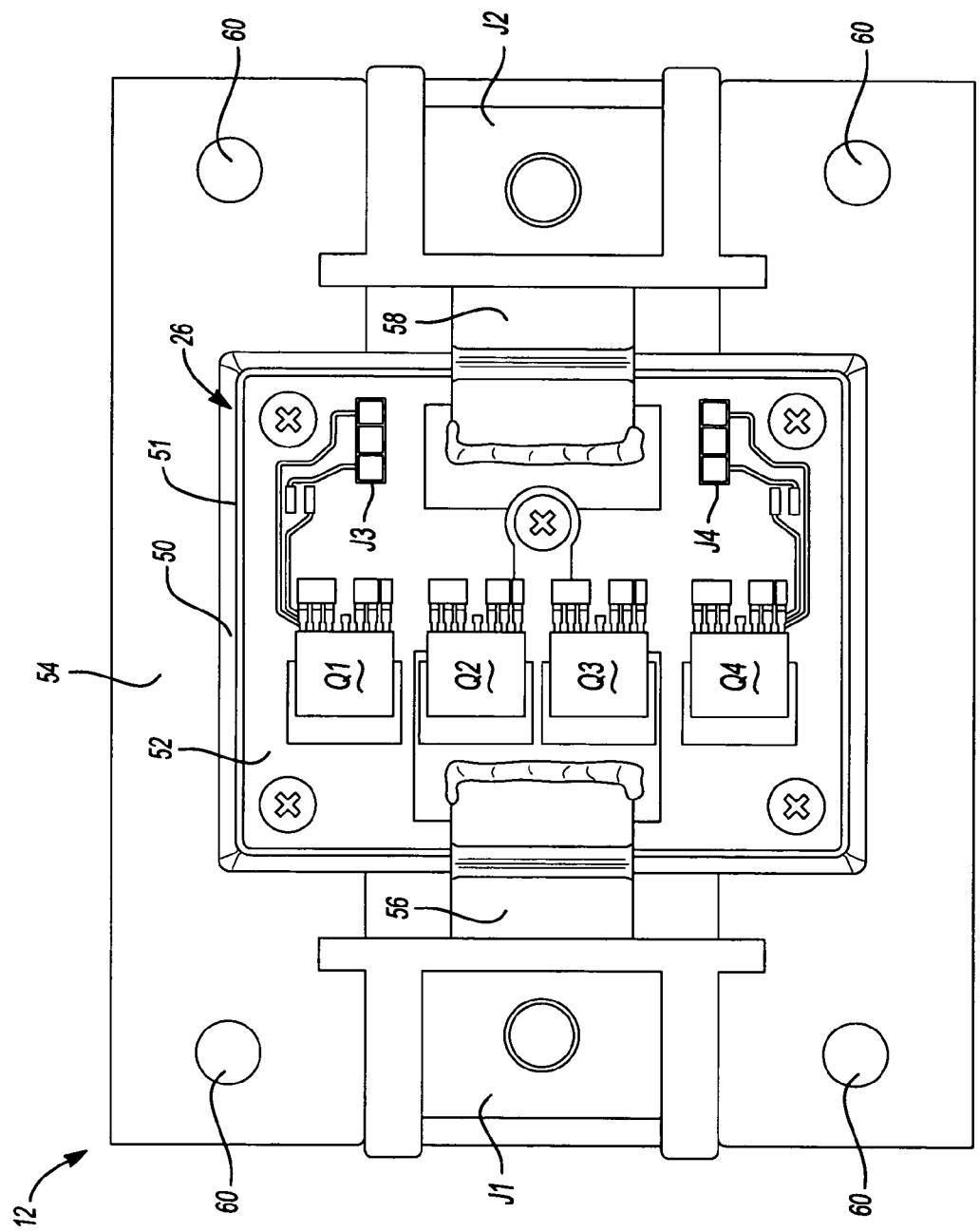
FIG. 5 is a plan view of a protective housing and thermal mass for the power module of FIG. 2.

Referring now to FIG. 5, one of several embodiments is shown of heater control module 12. A thermal mass 54, such as aluminum, includes a recess 50. Thermal mass 54 may be formed by casting, extrusion, and/or machining from a block of material. Thermal mass 54 houses heater control module 12 and absorbs heat from gate driver module 24 and power module 26. In some embodiments thermal mass 54 is sized such that it has enough thermal capacity to be free of heat sink fins and/or pins while keeping dies of transistors Q1-Q4 at or below their maximum operating temperature. Such a design allows thermal mass to provide sufficient cooling even when covered in mud and/or other debris that may be encountered in a vehicle environment and/or proximity of internal combustion engine 18. Thermal mass 54 may also include heat sink fins and/or pins.

Power module 26 is assembled on a printed circuit board (PCB) 52 that is mounted to a base of the recess 50. A thermal-conducting pad 51 can be positioned between PCB 52 and the base of recess 50. In some embodiments PCB 52 includes a base layer, a dielectric layer, and a circuit layer. The base layer of PCB 52 can be formed from a material such as copper or aluminum and mated and/or adhered to the dielectric layer. The dielectric layer of PCB 52 can be formed of high temperature, low thermal impedance, electrically isolating material such as a thin polyamide. The circuit layer of PCB 52 includes circuit traces that are mated and/or adhered to the dielectric layer and that connect the various components of power module 26. An example construction of PCB 52 includes T-Clad sold by The Bergquist Company. An example of thermal-conducting pad 51 includes Q-pad sold by the Bergquist Company.

The base of recess 50 conducts heat away from PCB 52 and into thermal mass 54. Terminals J1 and J2 are electrically insulated from thermal mass 54 and communicate with power module 26 through respective leads 56 and 58. Leads 56 and 58 provide a flexible connection between fixed terminals J1 and J2 and power module 26, thus relieving mechanical stresses generated by thermal cycling of power module 26. Leads 56 and 58 can be integrally formed with terminals J1 and J2 and soldered to circuit traces of PCB 52. Thermal mass 54 may be secured to other structures using one or more of mounting holes 60. In some embodiments thermal mass 54 may be fastened to, or integrally formed with, air heater 14.

Gate driver module 24 (not shown) can be assembled on a PCB that lies parallel with PCB 52. Connectors J3 and J4 are oriented to mate with connectors J8 and J9 (or J5 and J6, depending on a selected embodiment of gate driver module 24) of gate driver module 24.

Figure 6:
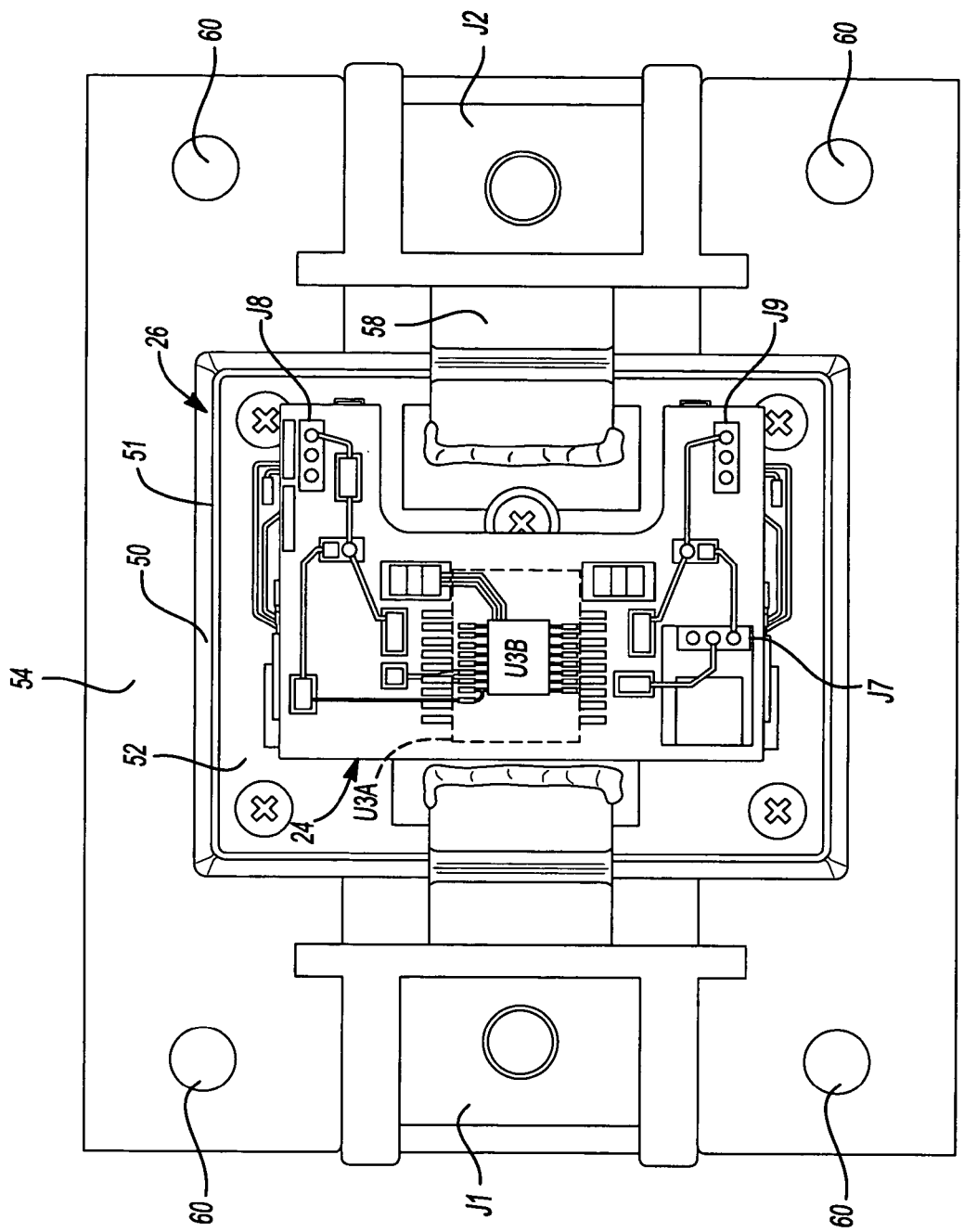
FIG. 6 is a plan view of the protective housing and thermal mass of FIG. 5 that includes the gate drive module of FIG. 4.

Referring to FIG. 6, heater control module 12 is shown in plan view with gate driver module 24 connected to terminals J3 and J4 of power module 26. Recess 50 may be filled with a potting material that protects gate driver module 24 and power module 26 from weather and/or contaminants. A cover (not shown) may also be secured to thermal mass 54 to enclose recess 50 and further protect gate driver module 24 and power module 26. The cover can include holes that align with holes 60 such that the cover can be secured by the mounting screws for thermal mass 54.

Figure 7:
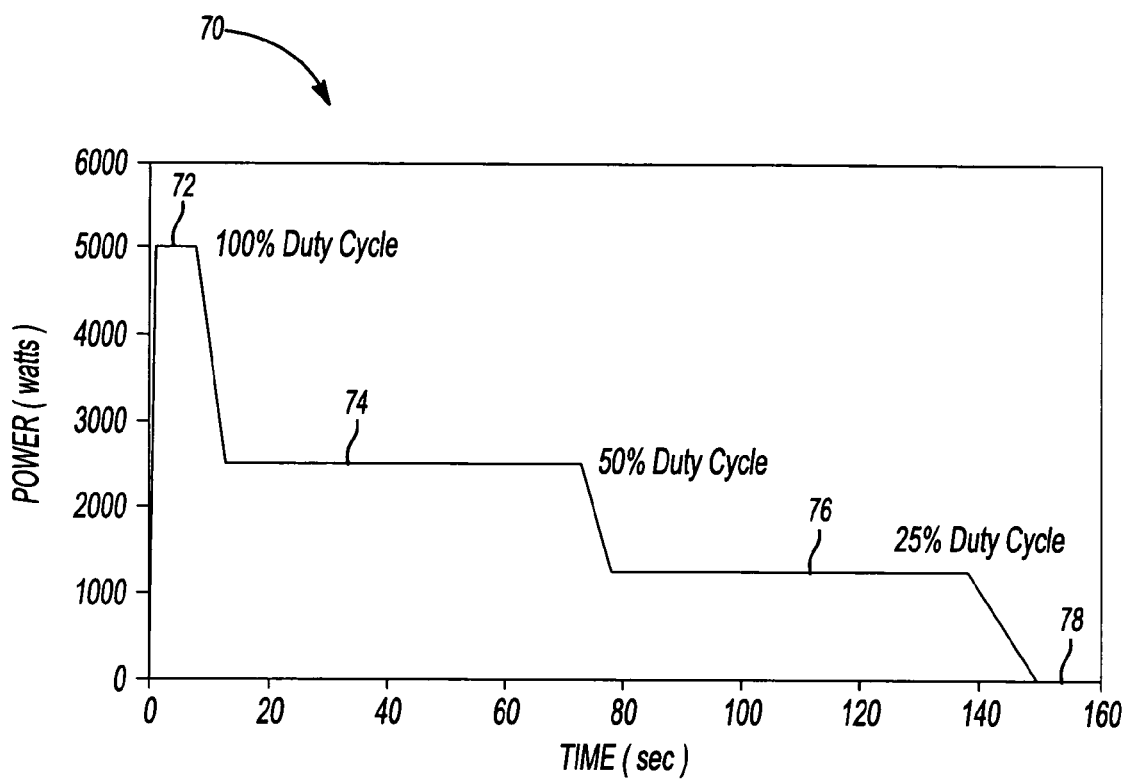
FIG. 7 is a timing chart showing an example of heater power as a function of time.

Referring now to FIG. 7, a timing chart 70 shows an example power profile for air heater 14. A vertical axis indicates power in watts. A horizontal axis indicates time in seconds. The power can be determined by control signal module 20 and communicated to heater control module 12 via control signal 22.

During a period 72 air heater 14 is turned on with gate drive signal 28 having a 100% duty cycle. Period 72 occurs prior to internal combustion engine 18 being started. Period 72 allows time for the air in inlet tube 16 to be heated and thereby improve fuel vaporization and/or combustion when internal combustion engine 18 is started. At the end of period 72, which can last about ten seconds, internal combustion engine 18 is started and the duty cycle of gate drive signal 28 is reduced to about 50% to begin a second period 74. During second period 74 air heater 14 heats air flowing though inlet tube 16. Second period 74 can last about 70 seconds. A third period 76 follows second period 74. During third period 74 internal engine 18 generates sufficient heat in inlet tube 16 to allow the duty cycle of gate drive signal 28 to be reduced to about 25%. The duration of third period 76 can be about 60 seconds. After third period 76 the duty cycle of gate drive signal 28 can be reduced to zero during a fourth period 78. Fourth period 78 terminates when internal combustion engine 18 is turned off. It should be appreciated the durations and/or duty cycles of periods 72-76 can be varied and/or eliminated based on ambient air temperature and/or a starting temperature of internal combustion engine 18. Worst-case (i.e. highest) duty cycles and durations of periods 72-76, thermal properties of transistors Q1-Q4 and PCB 52, and worst-case ambient temperature can be used to determine a mass of thermal mass 54.

What is claimed is:

1. An intake air heating system for an internal combustion engine, the system comprising:
   an electric heater that heats the intake air; and
   a control module that switches a first voltage to the electric heater based on a control signal, the control module comprising
       a gate drive module that includes a bootstrap charge pump module, the bootstrap charge pump module generating a bootstrap voltage that is greater than the first voltage, the gate drive module generating a gate drive signal based on the control signal and the bootstrap voltage, the gate drive signal being greater than the first voltage; and
       a power module that selectively connects the first voltage to the electric heater based on the gate drive signal.

2. The system of claim 1 wherein the control signal is a pulse width modulated (PWM) signal.

3. The system of claim 1 wherein the bootstrap charge pump module provides sufficient charge to drive the power module at 100% duty cycle.

4. The system of claim 1 wherein the power module includes a plurality of transistors that each provide an equal amount of current to the electric heater.

5. The system of claim 4 wherein the transistors are field effect transistors.

6. The system of claim 4 wherein the transistors are insulated gate bipolar transistors.

7. The system of claim 4 wherein each transistor includes a gate that receives the gate drive signal.

8. The system of claim 7 further comprising circuit elements having resistances in series with respective ones of the gates.

9. The system of claim 8 wherein values of the resistances are equal.

10. The system of claim 1 wherein the gate drive module includes
    an integrated circuit; and
    a printed circuit board that includes a first set of solder pads that accommodate a first package type for the integrated circuit and a second set of solder pads that accommodate a second package type for the integrated circuit.

11. The system of claim 1 wherein the power module is configured as a high-side driver of the electric heater.

12. The system of claim 1 wherein the gate drive module includes a second charge pump module that generates a second voltage regulated to a predetermined voltage level, and wherein the gate drive signal is based on the second voltage and the bootstrap voltage.

13. The system of claim 1 wherein the power module includes a printed circuit board that includes circuit traces on an electrically insulating film and a thermal layer that is mated to the film.

14. The system of claim 13 wherein the thermal layer is formed of at least one of aluminum and copper.

15. The system of claim 14 further comprising a thermal mass that draws heat from the thermal layer.

16. The system of claim 15 wherein the thermal mass includes heat dissipating projections.

17. The system of claim 1 further comprising an optoisolator that generates the control signal in response to an input signal.

18. The system of claim 1 wherein the power module comprises a plurality of transistors arranged in parallel, each of the plurality of transistors including a control terminal driven by the gate drive signal.

19. The system of claim 1 wherein:
the power module comprises a switch including a first terminal and a second terminal;
the first terminal of the switch is connected to the first voltage; and
the bootstrap charge pump module generates the bootstrap voltage based on a load voltage sensed at the second terminal of the switch.

20. The system of claim 19 further comprising a bootstrap capacitor, wherein:
the bootstrap capacitor includes a first terminal and a second terminal;
the second terminal of the bootstrap capacitor is connected to the second terminal of the switch; and
the bootstrap charge pump module generates the bootstrap voltage by charging the bootstrap capacitor via the first terminal of the bootstrap capacitor.

* * * * *